(12) United States Patent
Pasquali et al.

(10) Patent No.: US 6,434,563 B1
(45) Date of Patent: *Aug. 13, 2002

(54) WWW BROWSER CONFIGURED TO PROVIDE A WINDOWED CONTENT MANIFESTATION ENVIRONMENT

(75) Inventors: Sandro Pasquali, Ontario; Christopher Mark Gibson, Toronto, both of (CA)

(73) Assignee: Simple.Com, Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,443

(22) Filed: Dec. 9, 1999

Related U.S. Application Data

(63) Continuation-in-part of application No. 09/234,297, filed on Jan. 21, 1999, now Pat. No. 6,272,492.

(51) Int. Cl.⁷ .............................................. G06F 17/30
(52) U.S. Cl. ......................................... 707/10; 707/103
(58) Field of Search ............................ 707/10, 1, 2, 3, 707/9, 5, 103, 217, 104, 100

(56) References Cited

U.S. PATENT DOCUMENTS

| | | | |
|---|---|---|---|
| 5,418,950 A | 5/1995 | Li et al. | 707/4 |
| 5,913,215 A | 6/1999 | Rubinstein et al. | 707/10 |
| 6,061,738 A | 5/2000 | Osaku et al. | 709/245 |
| 6,064,979 A | 5/2000 | Perkowski | 705/26 |
| 6,148,330 A * | 11/2000 | Puri et al. | 709/217 |

OTHER PUBLICATIONS

Netscape communicator 4.05, www.netscape.com pp. 1–14, May 2, 1998.*

"Desktop.com" retrieved via the Internet and World–Wide Web at http://www.desktop.com—Jul. 24, 2000, 4:24 PM.

* cited by examiner

Primary Examiner—Sanjiv Shah
(74) Attorney, Agent, or Firm—Erik B. Cherdak & Associates, LLC

(57) ABSTRACT

A network client such as a WWW browser configured to facilitate a windowed content manifestation environment (CME) which is configured to operate within a data processing system and to receive content from a remote server system to facilitate a windowed content manifestation environment. In particular, the customized WWW browser application includes a content retrieval module configured to receive content from a network server system via an electronic data network, and a processing engine coupled to the content retrieval module. The processing engine is configured to provide a content manifestation environment within the data processing system, and to process the content to produce at least one corresponding window object within the content manifestation environment. The corresponding window object(s) are configured to manifest at least a portion of the content therein.

15 Claims, 8 Drawing Sheets

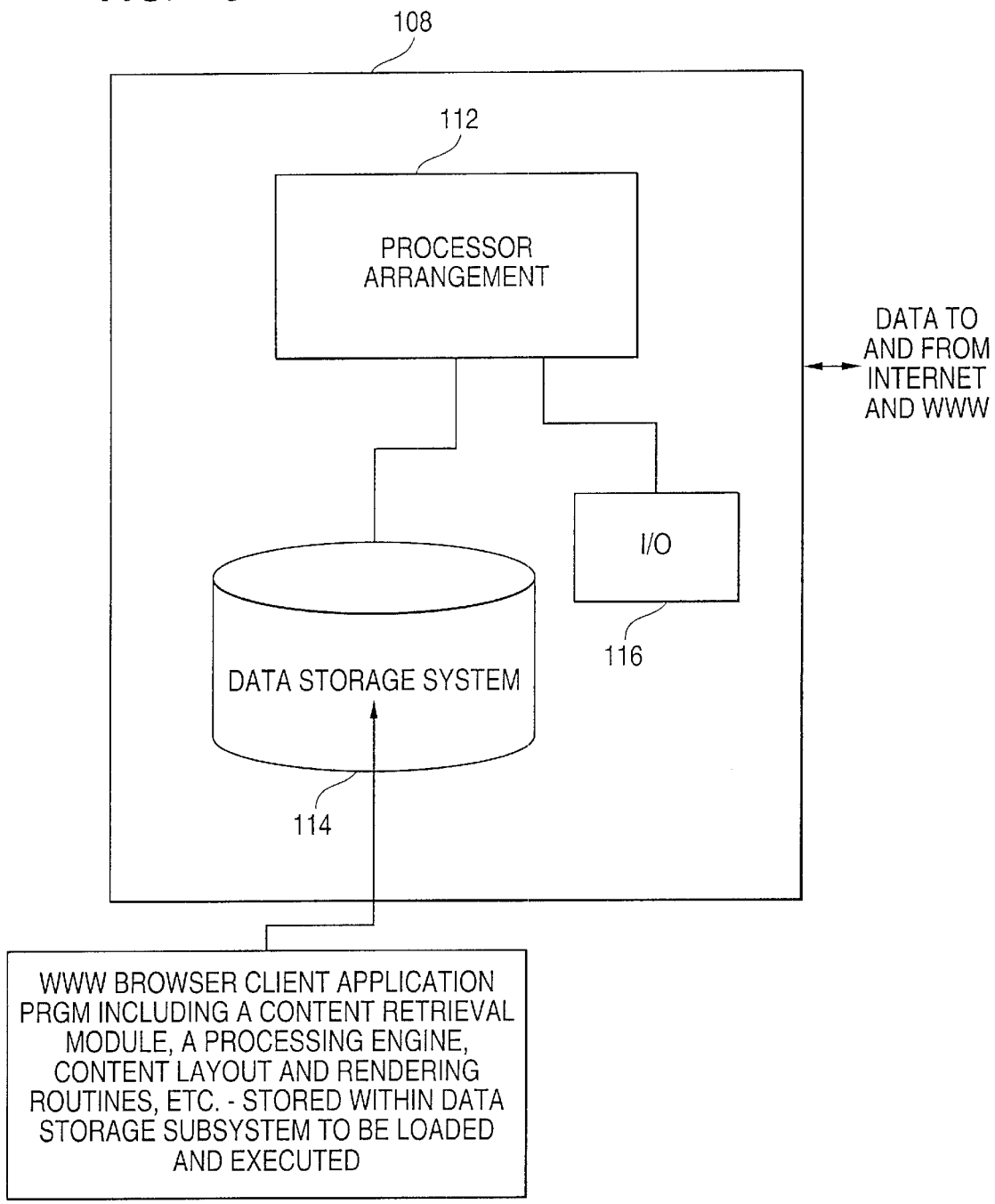

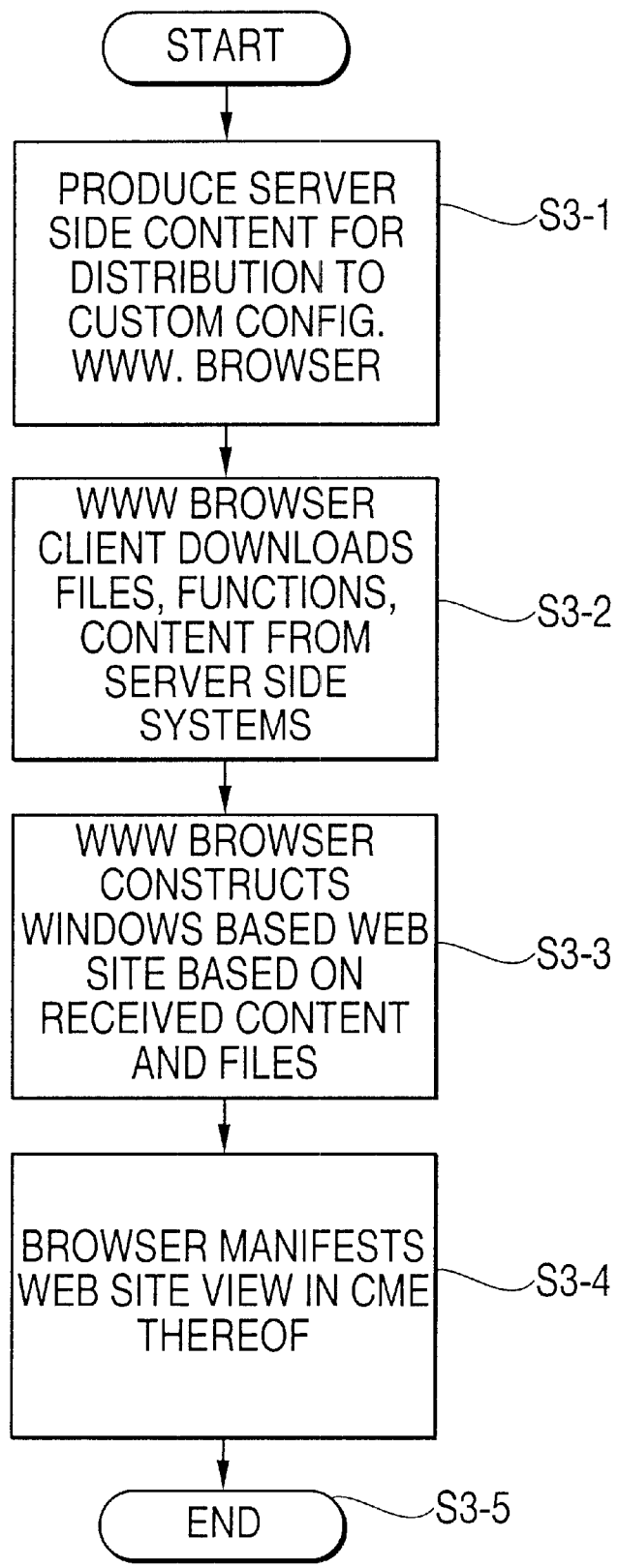

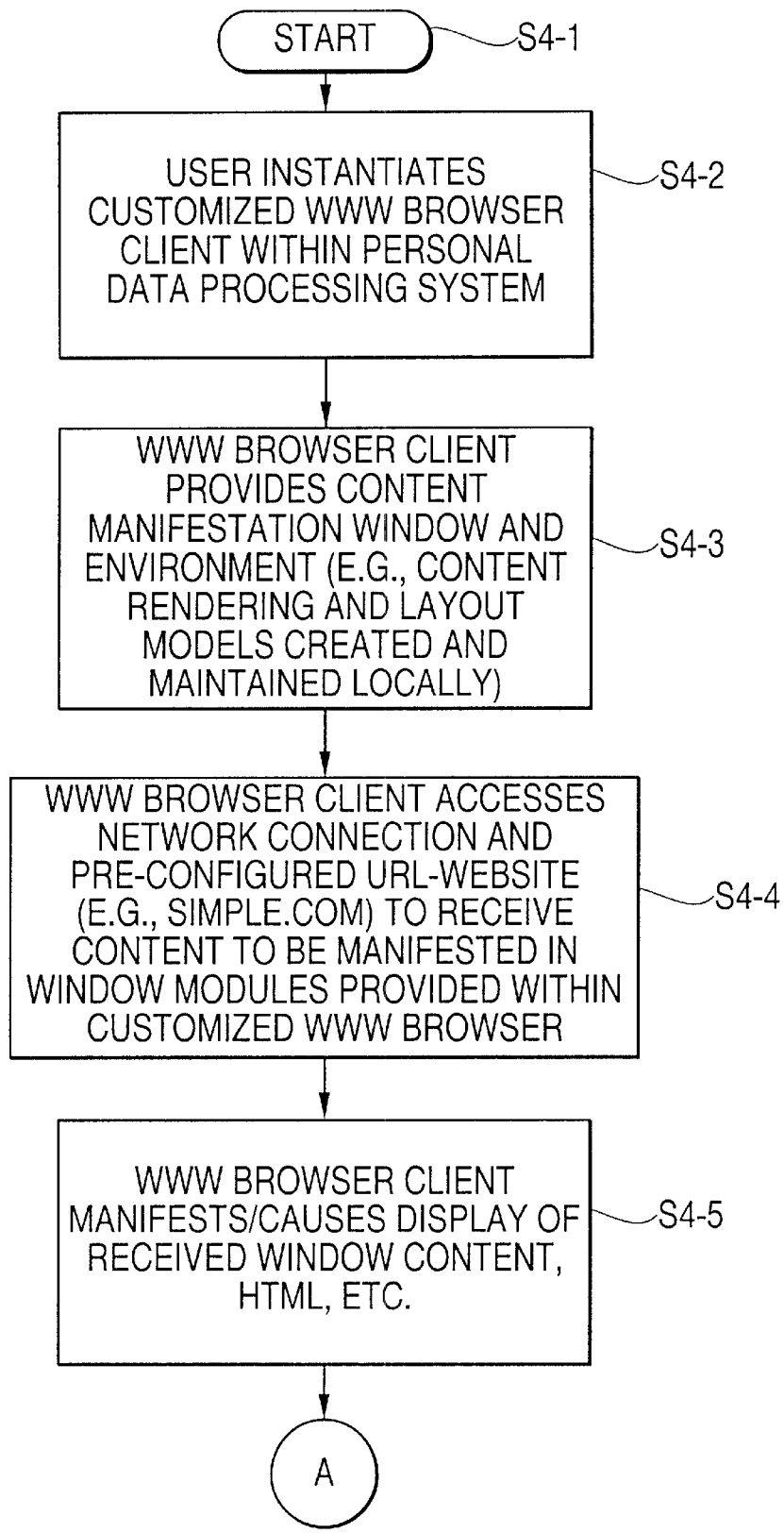

WWW BROWSER CONFIGURED TO PROVIDE A WINDOWED CONTENT MANIFESTATION ENVIRONMENT

RELATED APPLICATION DATA

This patent application is a continuation-in-part application related to U.S. patent application Ser. No. 09/234,297 filed Jan. 21, 1999 now U.S. Pat. No. 6,272,492.

MICROFICHE APPENDIX

Submitted with this application are computer program listings in paper form which also are or will be contained in a Microfiche Appendix which is attached hereto. The Microfiche Appendix includes XXXXX films containing XXXXX frames. Such computer program listings are hereby incorporated by reference.

BACKGROUND OF THE INVENTION

1. Field of the Invention

The present invention relates to systems and methods that are used to distribute and manifest content received via the Internet and World Wide Web (WWW). More particularly, the present invention relates to the dynamic manifestation of content within a WWW browser environment.

2. Description of the Related Art

The Internet and the World Wide Web (WWW) have significantly impacted the way people receive information, purchase goods and services, and, generally, communicate. The Internet and WWW have facilitated whole content delivery industries that provide up-to-the-minute delivery (and sale) of information such as news, weather, sports scores, horoscopes, stock and securities information, etc. Many companies have recognized the great "gold-rush" nature of the Internet and have been quick to establish web-sites where people (a.k.a. "network surfers") can visit to purchase books online, to receive specialized content such as investment and other reports, and to subscribe to content delivery services such as "electronic" newspapers and magazines. Despite the widespread use and acceptance of the Internet and the WWW, many industry analysts and insiders insist that our society has only begun to realize the advantages of publicly accessible network technologies and predict that our lives will only be further impacted by increased uses of the "Net."

At the same time that the Internet and WWW have become so widely used, the amount of content and information available and distributed via the same has grown exponentially. That volume of information has lead to significant problems for people (network surfers) in terms of locating and receiving desired content. Such problems are due in large part to the fact that while delivery technologies and systems have improved, the ability to organize, index, search, and process that content lags behind.

As such, many companies operate what are known as network indices and "search engines", and corresponding web sites. Network indices maintained at many web sites typically store expansive lists of links which may be entered manually by network users or which are gathered automatically. Search engines, on the other hand, automatically visit or "crawl" to network sites to automatically peruse content maintained thereby to build comprehensive databases (index files) that later may be scanned by network users through use of keywords via what are referred to as keyword searches. At the Internet and WWW site, www.yahoo.com, for example, network users (a.k.a. "network surfers") may select topic areas from among a pre-configured hierarchical network index tree to peruse lists of hyper-text links related to a particular field of interest (e.g., business, stocks, stock split announcements). The links found in the hierarchical network index may be manually entered by network surfers via an appropriate "add link" page, or may be entered automatically in response to automatic crawling techniques.

At the Internet and WWW site, www.lycos.com, for example, network surfers are prompted with a dialog box presented within their web browser screens to enter a set of keywords. Such keywords are then submitted back to a web-site server computer system and used to form the basis of an appropriate database query against pre-built databases of indexed content. The results of such queries are presented in the form of exhaustive hyper-text links which a network surfer may select by "clicking" to cause his web browser client application (e.g., the INTERNET EXPLORER® web browser which is manufactured and marketed by MICROSOFT CORPORATION) to traverse the same.

Aside from the aforementioned problems associated with actually locating content on the Internet and WWW, the tools used to peruse that content (and, often, long list of hyper-text links), such as web browser client applications and related software programs, are built to merely allow one screen-full of information to be perused at a time. For example, once a network surfer locates and accesses a content source (e.g., visits a web site containing content such as a list of related links, a news feed, stock related information, etc.), he may be faced with having to constantly refresh his web browser screen with the "next ten links," or scroll through a relatively large amount of text by using navigation buttons, scroll bars, browser application back and forward buttons, etc. Such browsing of content can be time consuming, frustrating, and often, fruitless.

Unfortunately, currently available web browser technologies and products do not effectively allow a network surfer to open a series of separate windows into which separate content streams may display corresponding information. For example, while an underlying operating environment such as MICROSOFT WINDOWS 98™ may support multiple windows each displaying the results of a different program, web browser tools and applications remain relatively crude in terms of their native ability to present only static and exhaustive amounts of text and content in a single content review window or environment (e.g., within a single web browser screen).

To combat the problems addressed above with regard to finding and accessing content and the limitations of the tools available to manifest the same, software developers have offered a variety of network content delivery solutions to generally enhance the web browsing experience. For example, developers have long taken advantage of the ability of web browsers to accept "plug-ins" and "helper" applications to provide for enriched content manifestation. Additionally, developers have begun to provide (serve) web content mixed with Java (and Java progeny) type code to enhance content review. And others have created web sites that cause instantiation of additional web browsers (i.e., they cause launching of additional web browser sessions within an operating system) to facilitate multiple window/browser application display of corresponding separate content streams.

An exemplary web site that seeks to ease content location (searching) and which attempts to enrich content manifestation is one maintained at www.mynetscape.com. Such an exemplary web site has become known as a "portal site"

where network surfers can visit, receive content from a variety of sources (e.g., news, financial feeds, etc.), and search the web through use of a search engine like or similar to those discussed above. Moreover, at the mynetscape.com portal site as viewed through a web browser, a network surfer is presented with a set of pseudo-windows corresponding to a set of content feeds and/or information requests (e.g., such as web content search templates provided in accordance with HTML instructions driven by computer graphic interface (CGI) scripts written in the PERL scripting language, etc.). Such content feeds are referred to at the mynetscape.com web site as "channels" to draw a parallel to television like stations that may be selected or viewed and even turned OFF. The pseudo-windows are drawn within a web browser screen and manifestation environment using HTML and javascript to appear like tile-type operating system windows which may be customized (changed in terms of the content that is displayed therein), maximized, minimized, and removed. For example, a "Stocks" channel (pseudo-window) may be perused for information related to certain securities markets and a headline news channel (pseudo-window) may be perused for news story highlight, etc. In each case, a channel (pseudo-window) has certain related controls which may be used to minimize, maximize, and remove the channel from view.

Although the mynetscape.com web site goes a long way to provide a multi-panel visual display of multiple content sources to attempt to facilitate easier location and review of content, it does not go far enough to deliver true window functionality like that offered within underlying operating systems. For example, unlike a true window object that dynamically displays content in an operating system context, a pseudo-window drawn within a network surfer's web browser is merely a screen section that appears to loaded with content. And that content that is drawn within a pseudo window is static and does not change after rendering by a web browser. In other words, all pseudo-windows rendered by a web browser are, in actuality, merely graphically-bordered screen sections within a web browser content manifestation window that statically display content and which must be completely re-drawn (along with all other pseudo-windows) each time a user-selectable screen-related operation/event occurs within a web browser screen (e.g., such as when a single pseudo-window minimization operation is requested by a user upon the occurrence of an appropriate mouse-click event). As such, the pseudo-window functionality provided by the mynetscape.com web site and all similar type web sites are not capable of providing truly controllable windows within a single unframed web browser content manifestation environment which can display dynamic content such as live video, updated stock tickers, motion video, etc.

Thus, there exists a need to provide new and improved systems and methods to facilitate a windowed content manifestation environment within a web browser application. Such systems and methods must allow effective and efficient implementation of web sites without requiring Internet and WWW infrastructures and standards to change. To be viable, network surfers must be able to access a web site to seamlessly take advantage of such new and improved systems and methods without being required to obtain or upgrade their personal computing environments, applications, or systems.

SUMMARY OF THE INVENTION

The present invention solves the above-described problems associated with providing access to network content and with manifesting the same to enhance network (WWW) use. In so doing, the present invention achieves certain benefits not heretofore realized with prior technologies to access and manifest content. For example, network surfers now can use a customized web browser application provided in accordance with the present invention to access a portal web site that delivers content in a format that is consistent with other software platforms that operate within a user's personal data processing system. Furthermore, providing a true windowing environment within the constraints of the Internet's infrastructure will allow content providers (e.g., web site operators) to incorporate the present invention to further enrich their sites and enhance the web usage experience. And, because a web browser content manifestation environment may now be made to manifest real content delivery windows without having to refresh a screen image each time a window is controlled, content providers and web site advertisers can cause active advertisements to be displayed and changed within a particular window without requiring a user to click a hyper-text link to purposefully access an additional web site. As such, both users and content providers alike will benefit from the present invention's new and improved content delivery model.

Accordingly, the present invention solves the aforementioned problems to deliver the above-described benefits by providing a network client, such as a customized WWW browser client or application, which is configured to operate within a data processing system and to receive content from a remote server system to facilitate a windowed content manifestation environment (CME). In particular, the customized WWW browser application includes a content retrieval module configured to receive content from a network server system via an electronic data network, and a processing engine coupled to the content retrieval module. The processing engine is configured to provide a content manifestation environment within the data processing system, and to process the content to produce at least one corresponding window object within the content manifestation environment. The corresponding window object(s) are configured to manifest at least a portion of the content therein.

BRIEF DESCRIPTION OF THE DRAWINGS

The present invention is described in detail below with reference to the following drawing figures, of which:

FIG. 1C is a block diagram of a client computing system that can now realize a windows based content manifestation environment provided in accordance with a preferred embodiment of the present invention;

FIG. 3 is a flowchart that generally depicts the process steps that are carried out to facilitate a windowed content manifestation environment within a WWW browser client according to a preferred embodiment of the present invention;

FIG. 4A is a flowchart that illustrates content delivery and processing operations that are performed within the system depicted in FIG. 1 to facilitate a windowed content manifestation environment within a customized WWW browser application according to a preferred embodiment of the present invention.

DETAILED DESCRIPTION OF THE PREFERRED EMBODIMENTS

Figure 1A:
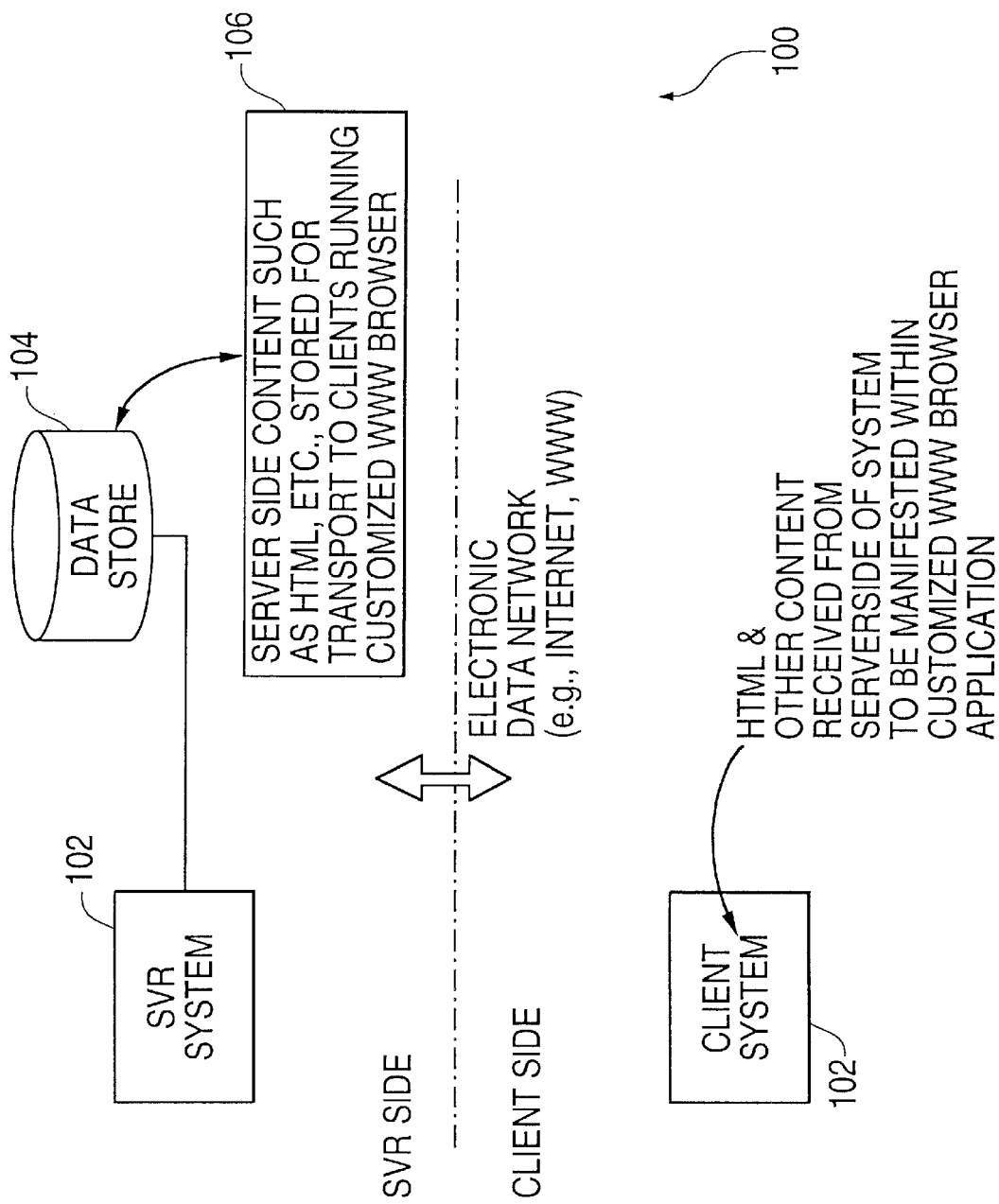
FIG. 1A is a diagram of a system in which a world wide web (WWW) browser client will realize a windows based content manifestation environment in a customized WWW browser application provided in accordance with a preferred embodiment of the present invention.

The present invention is now discussed in detail with reference to the drawing figures that were briefly described above. Unless otherwise specified, like parts, systems, and processes are referred to with like reference numerals.

GLOSSARY

The following terms are used within the instant patent document to illustrate and define the novel features of the present invention. Accordingly, reference should be had to this Glossary for definitions of terms that are used to provide enabling disclosure related to the present invention's systems and methods for facilitating a windows based content manifestation environment within a WWW browser.

The terms that are capitalized below bear the following meanings.

Content is any form of digital data stream that may be supplied or sent to a computing system such as a personal computer.

The WWW is the world wide web and its associated protocols and related technologies which may be accessed via the Internet.

A WWW Browser Client is a software application that is operative to receive and process content to produce a corresponding output (e.g., to manifest text and images within a browser window displayed on a monitor device, etc.).

An Electronic Data Network is any type of network environment from which at least one coupled computer or computing system is configured to receive content such as HTML and related WWW content and to process the same to produce an appropriate output. An exemplary electronic data network is the Internet along with the WWW.

A Window Object is a Module or a Layer.

A Layer is a WWW browser content display section produced within a content manifestation environment (CME) including, but not limited to, any object within an HTML document that may be scaled, dragged, or otherwise operated upon such as an IMG object, a SPAN object, a DIV object, a form element, etc. and which may be associated with program logic such as within a script, etc. A layer has its own properties including, but not limited to, a name, etc. within an HTML rendition model such as those defined by DHTML standards. Additionally, a layer acts independently of other content within a particular HTML document.

A CME is a controllable WWW browser content display window provided by a WWW browser such as within a customized WWW browser application provided in accordance with the present invention. For example, a CME is viewed as a dynamic window in which WWW content is normally displayed.

A Module (also referred to herein as a Window Module) is a layer having (1) a control section, and (2) a related content display section which may be manifested within a CME. A module may be recursively referenced in that a particular module provided in accordance with the present invention may include other modules. In other words, the present invention makes it possible to have window objects within window objects.

A DMOD is a draggable module much like a draggable type window provided within an operating system environment.

A TMOD is a tiled module much like a tiled type window provided within an operating system environment.

A Fixed Screen Region or FSR is an area of a screen environment such as within a CME in which content may flow based on Module operations, Java applet control, etc.

A Fixed Layer or FL is a layer having the same behavior as a FSR.

A Content Manifestation Layer or CML is a pop-up type layer much like a pop-up dialog box that can manifest content based on operations occurring within a Module (e.g., hyper-link traversal and/or occurrence of another event, etc.).

Module Controls or MCs control objects such as objects associated with screen icons that react to events (e.g., mouse clicks, mouse-overs, double-clicks, etc.) and which control attributes of a module (e.g., minimization, maximization, closure, resizing, etc.). The icons associated with such control objects will appear in a control section of a module.

The aforementioned and defined terms may be made plural in the text found below (e.g., "DMODs").

STRUCTURAL ASPECTS OF THE PRESENT INVENTION

Referring now to FIG. 1A, depicted therein is a system in which a windowed content manifestation environment (CME) may be facilitated in accordance with a preferred embodiment of the present invention. In particular, a system 100 includes a server system 102 such as a web server, an associated data store 104 which may form part of server system 102 and/or be part of a separate data storage facility such as one including multiple disk arrays and the like. Stored within data store 104 are HTML documents and other associated files 106 (discussed in detail below with regard to FIGS. 3, 4A, and 4B). Such files are generated in accordance with the present invention to facilitate a windows based content manifestation environment on or within network clients such as within customized WWW browsers provided by the present invention that may be used to download the same and to display content therein. Structures 102, 104, and 106, are maintained at a server side as indicated by the dashed line delineating the server side and the client side parts of system 100.

At a client side (e.g., within a client environment such as within a personal computing system,) a client system 108 is outfitted with appropriate software systems and a customized WWW browser provided in accordance with the present invention to access an electronic data network (e.g., the Internet and the World Wide Web) to couple to server side system SVR System 102 via a pre-configured uniform resource locator (URL—e.g., www.simple.com). Accordingly, client system 108 is configured to access and download HTML documents such as HTML documents and other related files 106 which may be generated and stored in data store 104.

The connection of client system 108 to server side SVR system 102 including the electronic data network (e.g., the Internet and World Wide Web) will be immediately understood by those skilled in the art. Accordingly, it should be noted that client system 108 may be coupled with SVR system 102 via the electronic data network such as through a dedicated network connection, a dial-up network connection or any other network connection that facilitates the transmission of HTML and other related files in accordance with the present invention. In particular, client system 108 may be coupled to server side server system 102 such as via a dial-up connection through an Internet service provider which facilitates TCP/IP communications, etc.

Figure 1B:
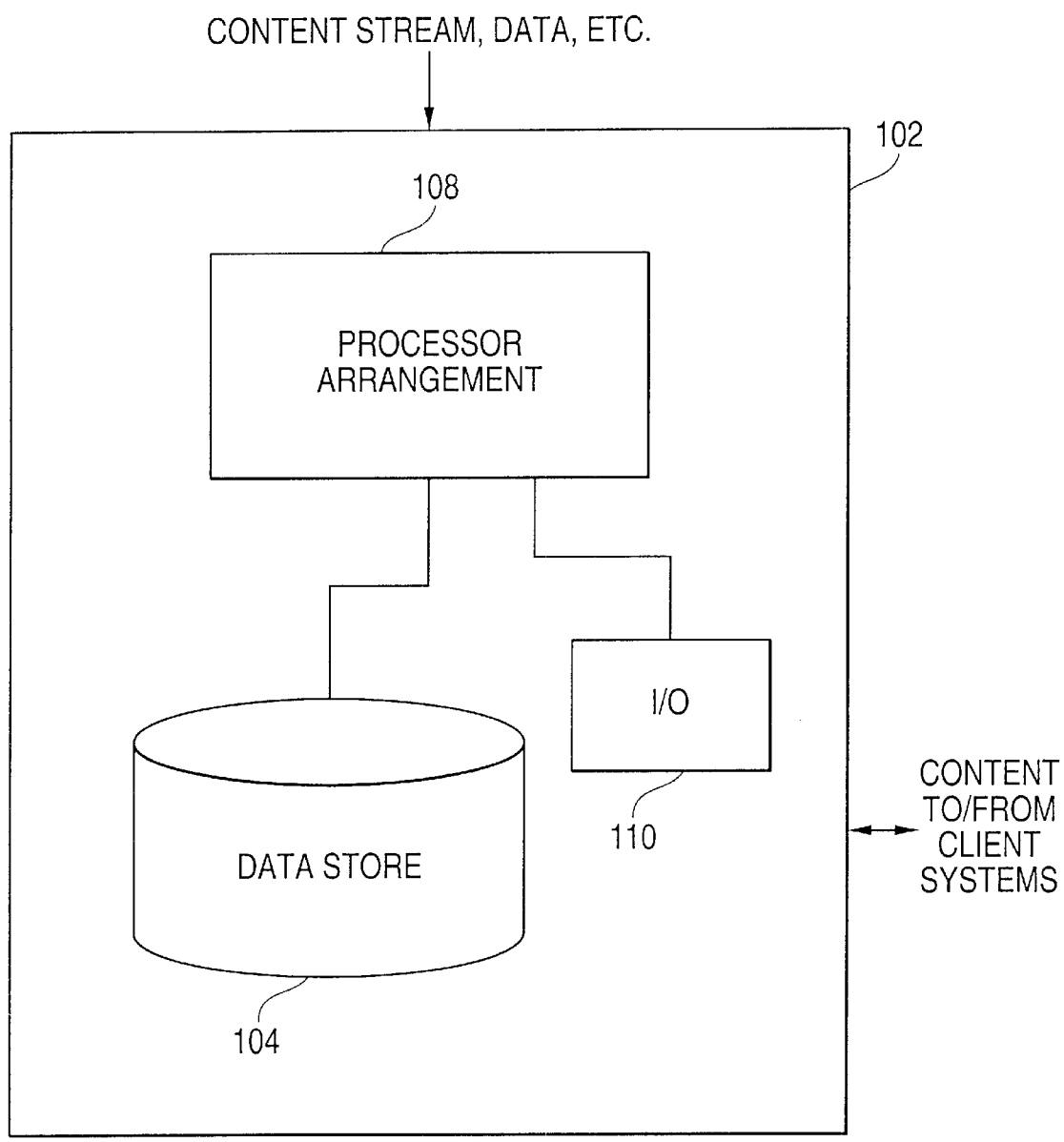
FIG. 1B is a block diagram of a server computing system of the kind that may be used to serve content via the Internet and WWW in accordance with a preferred embodiment of the present invention.

Referring now to FIG. 1B, depicted therein is a block diagram of server system SVR 102 as depicted in FIG. 1. In particular, SVR system 102 includes a processor arrangement 130, data store 104 as an integral component system thereof, and an I/O system 110 which supports network communications. In FIG. 1B, data store 104 is shown as being part of SVR system 102, but the present invention is not so restricted as illustrated in FIG. 1A. SVR system 102 may be implemented using a network server computing system such as one manufactured and marketed by SUN MICROSYSTEMS, INC. (e.g., the SUN SPARC 1000 computing system) or a WINDOWS NT™ based server system. Any computing system that facilitates service of web related documents (e.g., HTML documents, javascript files, etc.) via a network connection such as via the Internet and World Wide Web may be used in implementing the present invention.

Content streams and data such as news feeds, stock information, which may be provided by third party providers are input via I/O systems 110 and processed within SVR system 102 to provide web content to users located on the client side shown within system 100 (FIG. 1A). Accordingly, content including window object instructions, content, data, and content stream data are distributed via an electronic data network, such as the Internet and WWW, to a client system such as client system 108 (FIG. 1A).

Referring now to FIG. 1C, depicted therein is a block diagram of client system 108 as depicted in FIG. 1. In particular, client system 108 is a personal computing system that has a processor arrangement 112, a data storage sub system 114 such as a local disk array, and I/O facilities 116 such as a modem or other network coupling unit such as an network interface card (NIC), etc. Client system 108 is configured to operate in accordance with an operating system such as MICROSOFT WINDOWS 98 which is manufactured and marketed by MICROSOFT CORPORATION and which may be operated in accordance with customized WWW browser provided in accordance with the present invention. Accordingly, content retrieval modules and software routines contained therein which form part of a network client as mentioned above, which may be stored in data storage sub system as part of a network client application program. Accordingly, a processing engine of such a network client application will also be stored in data storage subsystem so that processor arrangement 112 may retrieve the same and process accordingly.

Data and content which is sent to and received from the Internet and World Wide Web such as from SVR system 102 (FIG. 1B) may be processed through I/O system 116 in a conventional manner.

Figure 1D:
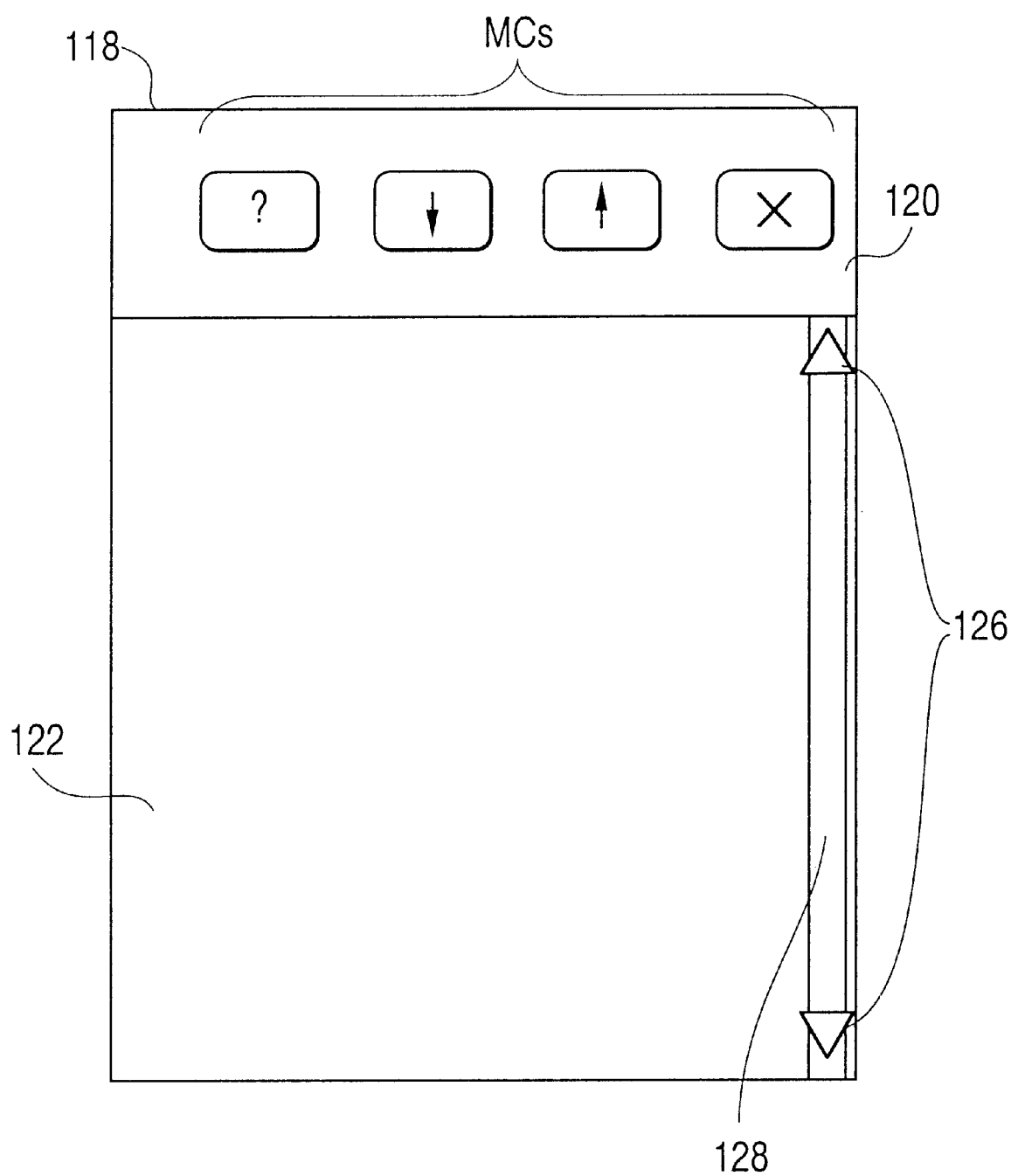
FIG. 1D is diagram of an exemplary window module provided in accordance with a preferred embodiment of the present invention.

Referring now to FIG. 1D, depicted therein is a diagram of an exemplary window module provided in accordance with a preferred embodiment of the present invention. In particular, window module or module 118 includes a control section 120 and a contend display section 122. Module 118 may be either a DMOD or a TMOD depending on particular design parameters. Preferably, however, module 118 is a DMOD to act like any other window such as those within a windows based operating system desktop environment.

Within control section 120, MCs 124 are included to allow a user to cause associated events to occur. For example, MCs 124 include objects and associated icons to allow a user to receive help (i.e., such as through the "?" icon), to minimize module 118 (i.e., via the down-arrow icon) much like windows are minimized within a windows based operating system, to maximize module 118 (i.e., via the up-arrow icon) much like windows are maximized within a windows based operating system, and to close module 118 via the "X" icon much like windows are closed within a windows based operating system.

The operation of any of the MCs 124 shown within control section 120 need not have a global effect on the entirety of the CME in which module 118 is displayed. That is, there is no requirement that operation of any of the MCs 124 will cause a screen refresh within a customized WWW browser CME. Such screen refreshes were common in prior web environments as an entire WWW browser CME (or at least a framed section thereof) was refreshed (re-loaded with content, etc.) each time a user selected or operated a link (e.g., a hyper-text link provided by a search engine to retrieve additional content such as "10-more links").

Content such as that received via an electronic data network, from a local hard disk, etc., may be displayed within content display section 122 of module 118. Accordingly, any type of content may be manifested within module 118. For example, static content like or similar to straight HTML content (e.g., text, graphics, etc.) may be manifested, while dynamic content such as from a content feed (e.g., a news fee, a stock ticker feed, etc.) may also be displayed and/or manifested. Accordingly, module 118 may act as a mini-CME within a WWW browser client CME and, in particular, much like a conventional window within a windows based operating system. Because module 118 may be a DMOD, a user may now freely move content display/ manifestation windows within a customized WWW browser's CME much like he does with program windows when viewing an operating system desktop environment (e.g., the WINDOWS 98™ desktop environment).

To facilitate easy display of content within content display section 122 of module 118, scroll controls 126 may be shown within a scroll bar 128. Scrolls controls 126 are provided when content extends beyond the vertical size of content display section 122 and may be used in a conventional manner. For example, scroll controls like or similar to scroll bars may be implemented using constructs within a customized WWW browser client provided by the present invention. And, since the present invention relies on IE's OCX files and systems to derive a customized WWW browser, IE V.4.x supports an "overflow:auto" CSS (cascading style sheet) property which applies to facilitate scroll bars, etc. in the context of the present invention to allow management of content that extends beyond a bottom edge of a visible area of a selected module.

In the context of the present invention and, in particular, with specific regard to FIG. 1D, manifestation of content is a broader concept than simple screen display; to the contrary, manifestation includes the causation of output generation that may start with operations within content display section 122 of module 118. For example, a hyper-link may be displayed within content display section 122 to invite a user click to cause sound to be manifested, etc.

Furthermore, because content display section 122 may dynamically display content such as from a feed or stream, users can now be presented with dynamic windows without having to traverse additional hypertext links, etc. And, since no user intervention is required to dynamically display/manifest content within content display section 122, a browser's CME becomes a dynamic and content-rich environment completely different from currently available static browsers. In essence, modules provided in accordance with the present invention and those similar to module 118 create a new WWW browser client application program that facilitates a novel, content-rich web experience.

The programming constructs and algorithms to achieve the functionality provided by module 118 within the context of the present invention are described in detail below with regard to FIGS. 3, 5A, and 5B and the program listings contained within the attached Microfiche Appendix. The program listings recorded in the Appendix include computer software written in and compiled using Borland (Inprise) Delphi V.4.0 Professional and requires prior installation of MICROSOFT Internet Explorer V.4.0, et seq. (including the MS-OCX library) to function. The use of such software systems is merely exemplary as the present invention is not limited to any particular implementation details of any single software package as will be readily understood by those skilled in the art.

It should be noted that the customized WWW browser running on a client data processing system such as client system 108 includes all graphical user facilities which may be hard coded as compiled Delphi routines (or other similar program constructs and routines such as those written in other computer languages) mentioned above. As such, no Javascript or HTML need be provided to drive the appearance of the program at runtime. Instead, the present invention provides a complete console solution that may be used to kiosk a customized WWW browser. Although, some web code may be downloaded at startup of client system 108 to determine the contents of button bars, etc., the same is parsed for relevant data only (URLs, text to display, images, etc.) by the customized WWW browser provided by the present invention. Actions taken by the application following a startup process such as clicking "GO" buttons, button selection, etc. are handled by the aforementioned Delphi-based routines. Accordingly, the present invention may make use of parsed data as parameters and does not require interpretation, translation, conversion or emulation web code (HTML, Javascript, etc.) into Delphi code in any way. The only actual active content being used is that which is displayed within the browser windows hosted within the window objects provided within the CME provided by customized WWW browser of the present invention.

Figure 2:
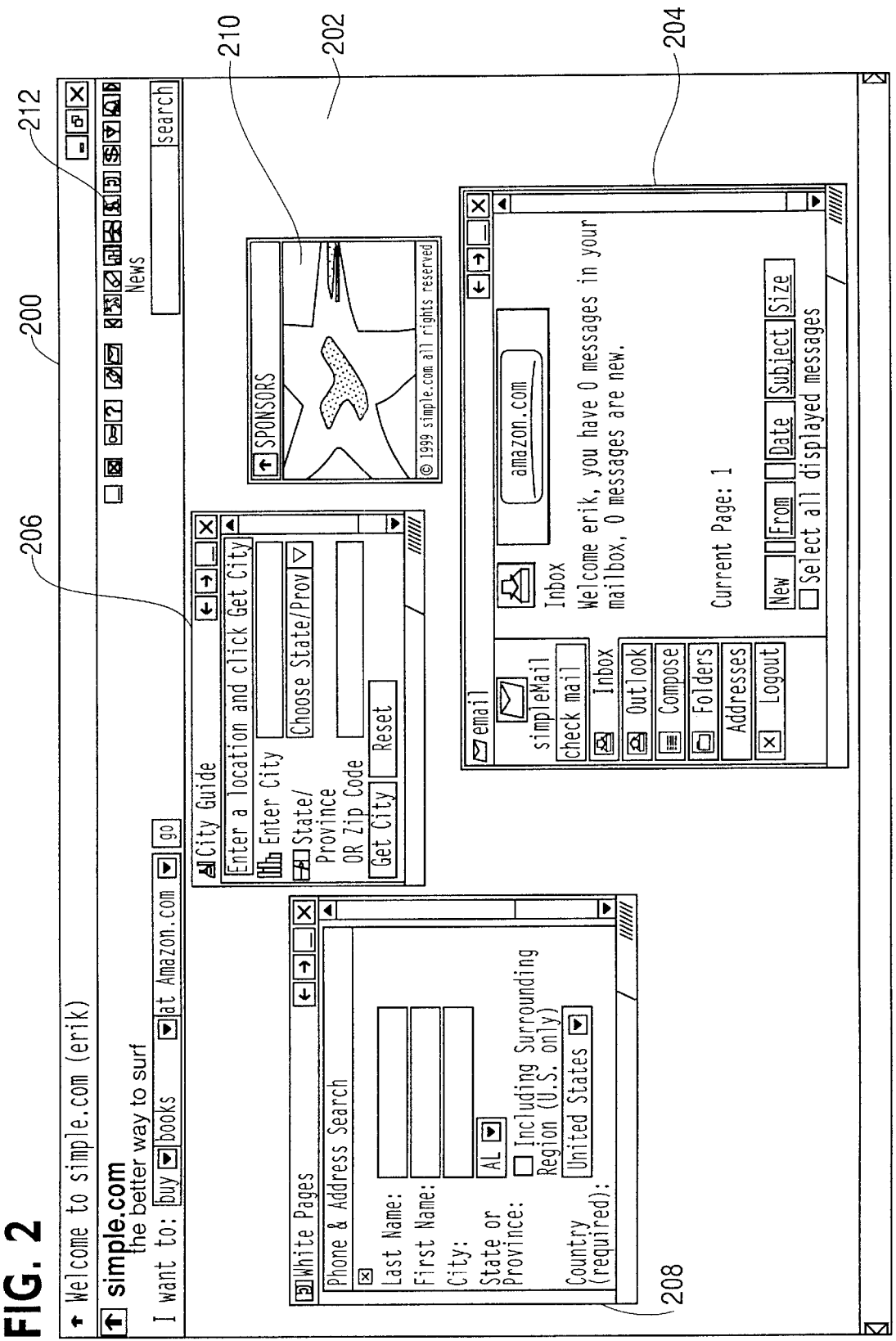
FIG. 2 is screen image that depicts a window based content manifestation environment provided by a customized WWW browser in accordance with a preferred embodiment of the present invention.

Referring now to FIG. 2, depicted therein is a screen image 200 of a content manifestation environment (CME) provided within a customized WWW browser provided by the present invention that has been configured to manifest content within DMOD type window modules that may be freely moved within the CME. In particular, the windows based content manifestation environment (CME) 202 shown in screen image 200 includes a DMOD 204 (e.g., an email content window in which a user may send and receive electronic mail messages), a DMOD 206 (a city guide feed display window), DMOD 208 (a telephone white pages content source), a specialized SPONSORS window 210 provided in accordance with co-pending U.S. patent application Ser. No. 09/252,076 entitled "SYSTEM AND METHOD FOR PROVIDING A DYNAMIC ADVERTISING CONTENT WINDOW WITHIN A WINDOWS BASED CONTENT MANIFESTATION ENVIRONMENT PROVIDED IN A BROWSER" which is assigned to the assignee of the instant patent document and which is incorporated herein by reference, and a set of web site controls 212 (e.g., navigation buttons, content/window selection buttons, etc.) which correspond to particular code functions which may control the manifestation of content (including window modules) within the CME maintained by a customized WWW browser provided in accordance with a preferred embodiment of the present invention.

CREATION AND OPERATION OF A WINDOWED CONTENT MANIFESTATION ENVIRONMENT WITHIN A WEB BROWSER OPERATIONAL ASPECTS OF THE PRESENT INVENTION

Referring now to FIG. 3, depicted therein is a general process flow chart that illustrates the operations performed and/or related to the structures described above with regard to FIGS. 1A–2 to generate content and related programs to facilitate a windows based content manifestation environment (CME) and the downloading of the same to a network client such as a customized WWW browser client provided in accordance with the present invention. Such a customized WWW browser client will manifest a CME that facilitates window module functionality according to the present invention. In particular, processing starts at step S3-1 where server side personnel and systems are used to generate and produce server side content including HTML and related files (e.g., javascript files, etc.) and which store the same on server side data storage facilities for distribution via an electronic data network such as the Internet and World Wide Web.

Next, at step S3-2, a customized WWW browser client provided in accordance with the present invention loads all files and functions and content stored with in server side systems after requesting the same via an electronic data network.

Next, at step S3-3, the custom configured WWW browser constructs a web site view within a CME thereof based on the received content, HTML, and other related files (e.g., javascript files, etc.). In particular, the received content, HTML, and other related files instruct the WWW browser client to manifest a windows based CME therein. The rendering and layout modules within the custom configured WWW browser may be implemented using the MICROSOFT IE OCX file library of components.

Next, at step S3-4, the custom configured WWW browser client will manifest the web site view in its CME to allow a user to operate upon received content within a windows based environment much like a windowed environment or shell of an operating system (e.g., much like the WINDOWS 95, 98, NT, UNIX X-WINDOWS environment—WINDOWS, 95, 98, and NT are trademarks of and which may be registered to MICROSOFT CORPORATION, UNIX is a trademark of AT&T CORPORATION).

Processing ends at step S3-5.

The general process flow described above in regard to FIG. 3, is now described in further detail by specifically illustrating the aforementioned process steps with reference to FIGS. 5A, and 5B.

Figure 4B:
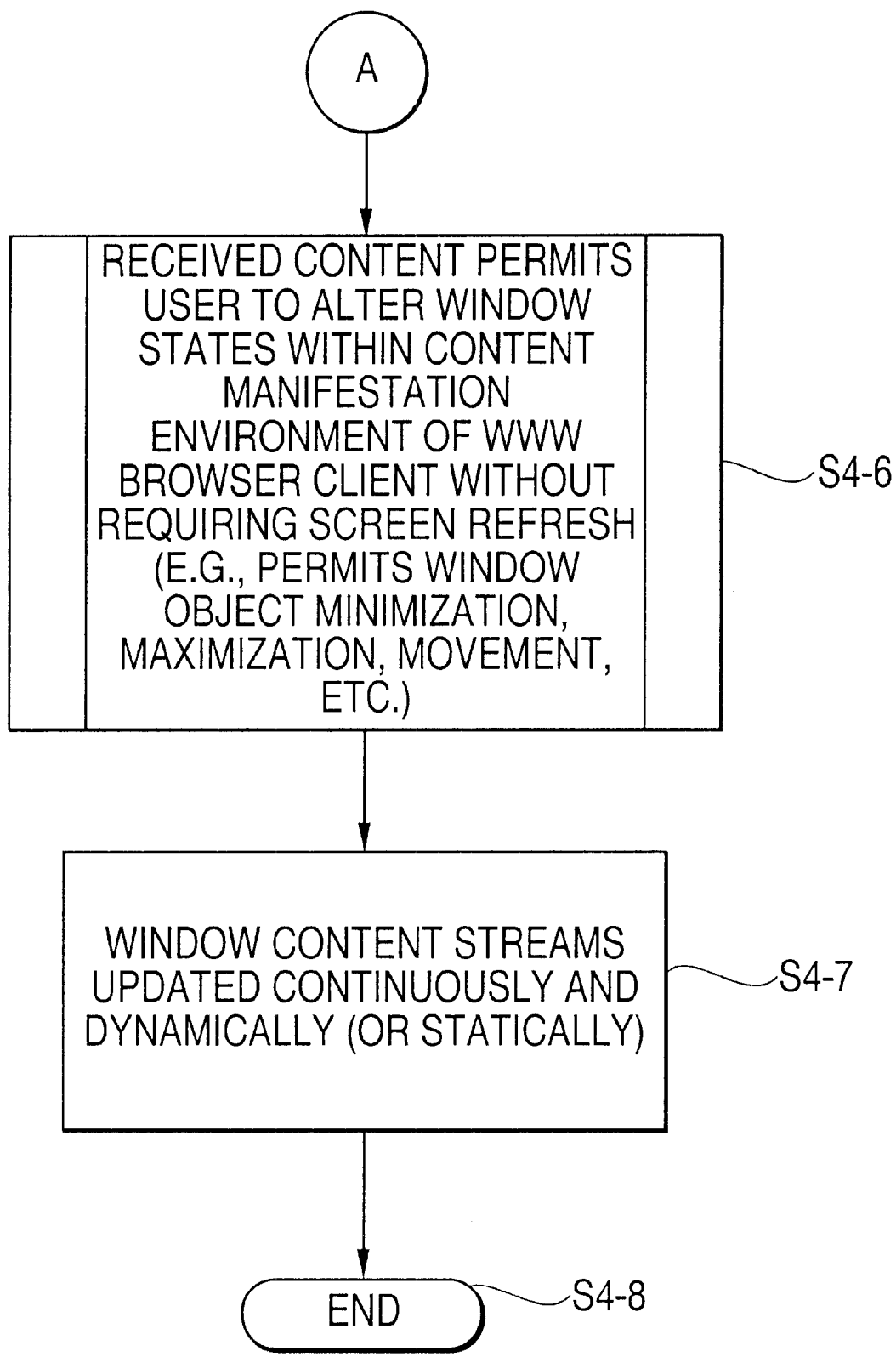
FIG. 4B is the conclusion flowchart to the flowchart started in FIG. 4A.

Referring now to FIGS. 4A and 4B, depicted therein is a flowchart that illustrates a process to facilitate window type operations within a custom configured WWW browser provided in accordance with the present invention and, in particular, in a CME thereof. In particular, processing starts at step S4-1 and immediately proceeds to step S4-2.

At step S4-2, a user may start a custom configured WWW browser client within a personal data processing system such as within system 108. That is, a WWW browser client is loaded into a processing space within a personal data processing system and executed accordingly.

Next, at step S4-3, the custom configured WWW browser client provides a CME environment within a browser display window and starts appropriate content rendering and layout models.

Such content rendering and layout models are provided by the aforementioned routines found within the MS OCX library and are called within the programs listed in the attached Microfiche Appendix which has been incorporated herein by reference. Those skilled in the art will understand the programs and listing therein contained. Accordingly, the programs contained in the attached Appendix along with the routines forming the MS OCX library make up the custom configured WWW browser provided by the present invention. The MS OCX library, in particular, provides network accessing routines along with content rendering, layout routines, HTML processing routines and engines, etc. which will be readily apparent to those skilled in the art. The program listings included within the attached Appendix includes routines and objects as follows:

WinSim.DPR—top level project file for Delphi compiler.
Bitmaps.RC—script file for generating bitmaps.res, which is compiled into the program and contains all bitmaps used.
Misc.RC—script file for generating misc.res, which is compiled into the program and contains several HTML documents used internally by winsim
PaintPanel.PAS—extension of the TPanel component which exposes the onPaint event, allowing for custom painting of the panel. Used in the "MainForm" at the top and bottom area of the window (displays "lined" background) to contain the button bar (BtnMGR), site engine (SiteMGR), and minimized windows (WinMGR)
SimpleButton.PAS—custom made component to act as a button which displays a different image dependent on state (normal, disabled [grayed], mouseover, and mousedown[pressed]). Used in the button bar (BtnMgr)
Defs.PAS—globally accessible module containing frequently used functions etc
BrowseFunc.PAS—globally accessable module containing frequently used functions, etc. pertaining specifically to creating and displaying stand-alone instances of Internet Explorer outside of the host application (SiteMGR)
BtnMGR.PAS—defines the Button Manager class . . . which controls details of all buttons seen at the top of the "MainForm".
WinMGR.PAS—defines the Window Manager class . . . which controls details of all browser windows hosted within the "MainForm", including proper construction/destruction of browser windows, size/position tracking, windowstate (minimized/normal), display/scrolling of minimized windows in the minimize area at the bottom of "MainForm"
SiteMGR.PAS—defines the Site Manager class . . . which controls all details of Site Engine ("I want to . . . ") and search functionality (formerly search and surf . . . Control of surf is now handled by the Button Manager [BtnMgr.PAS])
The "_MGR.PAS" files described above all retrieve data from the a web site pertaining to the interface itself (not including content). Such data is displayed within the Site Engine construct, or the URLs linked to by the buttons displays in the button bar.

EmbeddedWB.PAS
  THIS IS THIRD PARTY CODE made freely available on the web with no restrictions from:
  Lindsoe Larsen
  lindsoe@post.tele.dk
  http://www.euromind.com
  Exposes some additional features of the Internet Explorer OCX which are not readily accessible via the component that Delphi creates when importing the OCX (SHDocVW.DLL)
Splash.PAS—the initial loading window detailing login status
MainForm.PAS—the main window of the application . . . plays host to all browser instances.
NoBrowser.PAS—window displayed in place of "MainForm" if system test for a valid browser (Internet Explorer 4 or higher) fails . . . normal program flow never occurs
Login.PAS—window permitting logging-in to a particular web site (so secure functions such as email will function), as well as providing a link to the web sites' registration page
Browsers.PAS—the code defining the actual browser windows displayed within "MainForm" in the host application
SHDocVW_TLB.PAS & MSHTML_TLB.PAS—programs generated by DELPHI when the Internet Explorer related files are imported.

With continued reference to FIG. 4A, and, in particular, at step S4-4, the custom configured WWW browser client accesses a network connection and the pre-configured and pre-specified web site (e.g., www.simple.com) and receives windowed content including object instructions and content streams (e.g., such as those from news fees, stock feeds, other dynamic source, etc.) or related URLs, if any.

Next, at step S4-5, the custom configured WWW browser client manifests and displays received window content, HTML etc such as via dynamic (changing) display within a particular window module. Alternatively, depending on the implementation of a windows based CME that is actually developed and implemented in accordance with the present invention, content such as that received via a content stream may be displayed in an FSR, a layer, etc. within a CME.

Processing proceeds at the top of FIG. 4B.

At step S4-6, the user is permitted to alter window module states (e.g., size of a window, position of a window, minimization, maximization, etc.) within a CME of a WWW browser client without necessarily requiring screen refresh (e.g., is permitted to affect window module minimization, maximization, movement, resizing, etc.). The software routines that may be used to support such functionality are contained in the aforementioned Microfiche Appendix.

Next, at step S4-7, window content streams may be updated so that dynamic content may be displayed within window modules provided by the present invention.

Processing ends at step S4-8.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:
1. A network client configured to operate within a data processing system and to receive content from a remote server system to facilitate a windowed content manifestation environment, comprising:

a content retrieval module configured to receive content from a network server system via an electronic data network; and a processing engine coupled to said content retrieval module configured to provide a content manifestation environment within the data processing system, to process said content to produce at least one corresponding window object within said content manifestation environment, said at least one corresponding window object configured to manifest at least a portion of said content therein without requiring said content manifestation environment to be refreshed, said at least one corresponding window object is associated with a controllable attribute, said controllable attribute configured to permit said at least one corresponding window object to be controlled as a result of performing at least one of a moving operation, a resizing operation, a minimizing operation, or a maximizing operation within said content manifestation environment.

2. The network client according to claim 1, wherein said processing engine is further configured to process said content to produce a control section and a content display section within said at least one corresponding window object, said content display section configured to manifest at least a portion of said content therein, said control section including a set of at least one control corresponding to a set of attributes which operate to affect manifestation of said at least one window object and at least a portion of said content within said content display section.

3. The network client according to claim 1, wherein said content retrieval module and said processing engine are implemented as sets of computer software objects.

4. The network client according to claim 1, wherein said content manifestation environment generated by said processing engine is a WWW browser window.

5. The network client according to claim 1, wherein said content retrieval module is configured to receive said content via the Internet.

6. A network client configured to operate within a data processing system and to receive content from a remote server system to facilitate a windowed content manifestation environment therein, comprising:

a content retrieval module configured to receive content from a network server system via an electronic data network; and a processing engine coupled to said content retrieval module configured to instantiate a content manifestation environment within the data processing system, to process said content to produce at least one corresponding window object within said content manifestation environment, said at least one corresponding window object associated with a set of at least one controllable attribute and configured to manifest at least a portion of said content therein, said set of at least one controllable attribute configured to affect manifestation of said at least one corresponding window object by the network client within said content manifestation environment by permitting said at least one corresponding window object to be controlled as a result of performing at least one of a moving operation, a resizing operation, a minimizing operation, or a maximizing operation within said content manifestation environment without requiring said content manifestation environment to be refreshed.

7. The network client according to claim 6, wherein said at least one corresponding window object executes within the network client.

8. The network client according to claim 6, wherein said at least one corresponding window object is derived based on instructions processed by said processing engine.

9. The network client according to claim 6, wherein said content includes at least one address of a network content source that is configured to download information to said data processing system via said electronic data network, said information to be manifested within said at least one corresponding window object within said content manifestation environment.

10. The network client according to claim 6, wherein said content includes at least one address of a network content source that is configured to download information to said data processing system via said electronic data network, said information to be dynamically and continuously manifested within said at least one corresponding window object within said content manifestation environment.

11. The network client according to claim 6, wherein said content includes at least one address of a network content source that is configured to download information to said data processing system via said electronic data network, said information to be dynamically and continuously manifested within said at least one corresponding window object within said content manifestation environment without requiring said content manifestation environment to be refreshed within the network client.

12. The network client according to claim 6, wherein said set of controllable attributes associated with said at least one corresponding window object permit said at least one corresponding window object to be moved within said content manifestation environment.

13. The network client according to claim 6, wherein said set of controllable attributes associated with said at least one corresponding window object permit said at least one corresponding window object to be resized within said content manifestation environment.

14. The network client according to claim 6, wherein said set of controllable attributes associated with said at least one corresponding window object permit said at least one corresponding window object to be minimized within said content manifestation environment.

15. The network client according to claim 6, wherein said set of controllable attributes associated with said at least one corresponding window object permit said at least one corresponding window object to be maximized within said content manifestation environment.

* * * * *